(12) United States Patent
Patwardhan et al.

(10) Patent No.: US 10,061,654 B1
(45) Date of Patent: Aug. 28, 2018

(54) DEPTH FIRST SEARCH OF SUMMARY CHANGE LOG RECORDS FOR BACKUP

(71) Applicant: EMC Corporation, Hopkinton, MA (US)

(72) Inventors: Kedar Patwardhan, Mahrashitra (IN); Maruthi Seshidhar Inukonda, Kakinada (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 519 days.

(21) Appl. No.: 14/868,142

(22) Filed: Sep. 28, 2015

(51) Int. Cl.
*G06F 17/30* (2006.01)
*G06F 11/14* (2006.01)

(52) U.S. Cl.
CPC ...... *G06F 11/1451* (2013.01); *G06F 11/1461* (2013.01); *G06F 11/1464* (2013.01); *G06F 17/30368* (2013.01); *G06F 2201/84* (2013.01)

(58) Field of Classification Search
CPC .................................................. G06F 11/1451
See application file for complete search history.

(56) References Cited

U.S. PATENT DOCUMENTS

| 7,552,125 | B1* | 6/2009 | Evans | G06F 17/30 |
| 7,836,025 | B1* | 11/2010 | Bali | G06F 11/1441 |
| | | | | 707/674 |
| 8,661,068 | B1* | 2/2014 | Seibel | G06F 17/30132 |
| | | | | 707/825 |
| 9,645,892 | B1* | 5/2017 | Patwardhan | G06F 11/1466 |
| 2011/0295804 | A1* | 12/2011 | Erofeev | H04L 29/0854 |
| | | | | 707/634 |

\* cited by examiner

*Primary Examiner* — Mahesh H Dwivedi
(74) *Attorney, Agent, or Firm* — Barry N. Young (57) ABSTRACT

A backup system and method for a large data store employs a new and enhanced summary change log data structure that records all file system changes comprises inode entry records augmented with additional fields to indicate inodes representing related child and parent file system objects. A single preprocessing pass through the summary change log augments all of the appropriate inode fields with the appropriate inode numbers of family members to create a graph structure that can be traversed in hierarchical order starting at a root inode to quickly identify all created and modified file system objects for inclusion in an incremental backup.

14 Claims, 6 Drawing Sheets

| Inode No. | 5 | |
| Parent No. | 24 | /dir0/dir1/file33.txt was created |
| Change Flag | C | |
| filename | file33.txt | |

| Inode No. | 6 | |
| Parent No. | 80 | /dir0/file2.txt was deleted |
| Change Flag | D | |
| filename | file2.txt | |

| Inode No. | 24 | |
| Parent No. | 80 | /dir0/dir1 was created |
| Change Flag | C | |
| filename | dir1 | |

| Inode No. | 80 | |
| Parent No. | 2 | /dir0 was modified |
| Change Flag | M | |
| Filename | dir0 | |

| Inode No. | 50 | |
| Parent No. | 80 | /dir0/file23 was created |
| Change Flag | M | |
| filename | file23 | |

| Inode No. | 2 | |
| Parent No. | 2 | |
| Change Flag | | |
| filename | / | |

Summary Change Log File          File Entries

DEPTH FIRST SEARCH OF SUMMARY CHANGE LOG RECORDS FOR BACKUP

BACKGROUND

This invention relates generally to the backup of large data storage systems, and more particularly to optimizing incremental backup of data in enterprise data storage.

Businesses and other enterprises generate and use data for business and other enterprise operations. Frequently they generate and store large quantities of data which is essential to their operations, and any loss of data can be costly and have serious consequences. Thus, prudent businesses and enterprises have data backup and recovery systems for protecting against loss of data by periodically storing copies of the data.

There are different types of backup and recovery systems available. It is well known that repeatedly performing a full backup of data is inefficient, costly and consumes a large amount of storage space. Instead, many backup and recovery systems perform an incremental backup which only backs up and stores modifications or changes to the data since the last backup. Incremental backup systems can substantially reduce the amount of space necessary to store the backup data. However, they have some other undesirable aspects.

For instance, to identify the data which have changed since the last backup an incremental backup system may have to examine all of the data files by trawling the entire file system to determine which files have been changed and generate a list of new and modified files. For large data systems which may have millions of files, this can consume significant resources and time, and can degrade the system performance.

Since data storage systems conventionally maintain native summary change logs that record all changes to data files, some incremental backup systems use the summary change logs to identify files which have been changed, instead of trawling the entire file system and analyzing all the files. However, conventional change logs also have problems and can also degrade performance. This is because conventional change logs are both temporal and transactional in nature. They record all of the changes made to files in a file system in the change log sequentially in time order of the changes and at the various times the changes are made. A particular file may be created, changed a number of times, and then deleted during the time between successive backups. Thus, while a conventional summary change log records all of these various changes to the file, the change entries recorded in the change log will be made at the random times that the changes to the file occurred, and changes to a particular file will be interspersed temporally in the change log among all of the thousands or millions of other change entries to other files. The randomness of the entries in the summary change log also creates performance problems and inefficiencies. During backup, all of the entries in change log may have to be processed and sorted hierarchically (temporally) to determine that a particular file was ultimately deleted and, therefore, can be ignored in the backup. Accordingly, using the conventional summary change log for an incremental backup can also be time and resource consuming, inefficient and degrade performance.

It is desirable to provide backup approaches for the data storage systems of enterprises and businesses that address the foregoing performance, inefficiencies and other known problems of backing up such systems, and it is to these ends that the invention is directed.

DESCRIPTION OF PREFERRED EMBODIMENTS

This invention is particularly well adapted for determining changes to files in a file system of an enterprise data store for incremental backup, and will be described in that context. It will be appreciated, however, that this is illustrative of only one utility of the invention and that the invention may be used in other environments and for other purposes.

Figure 1:
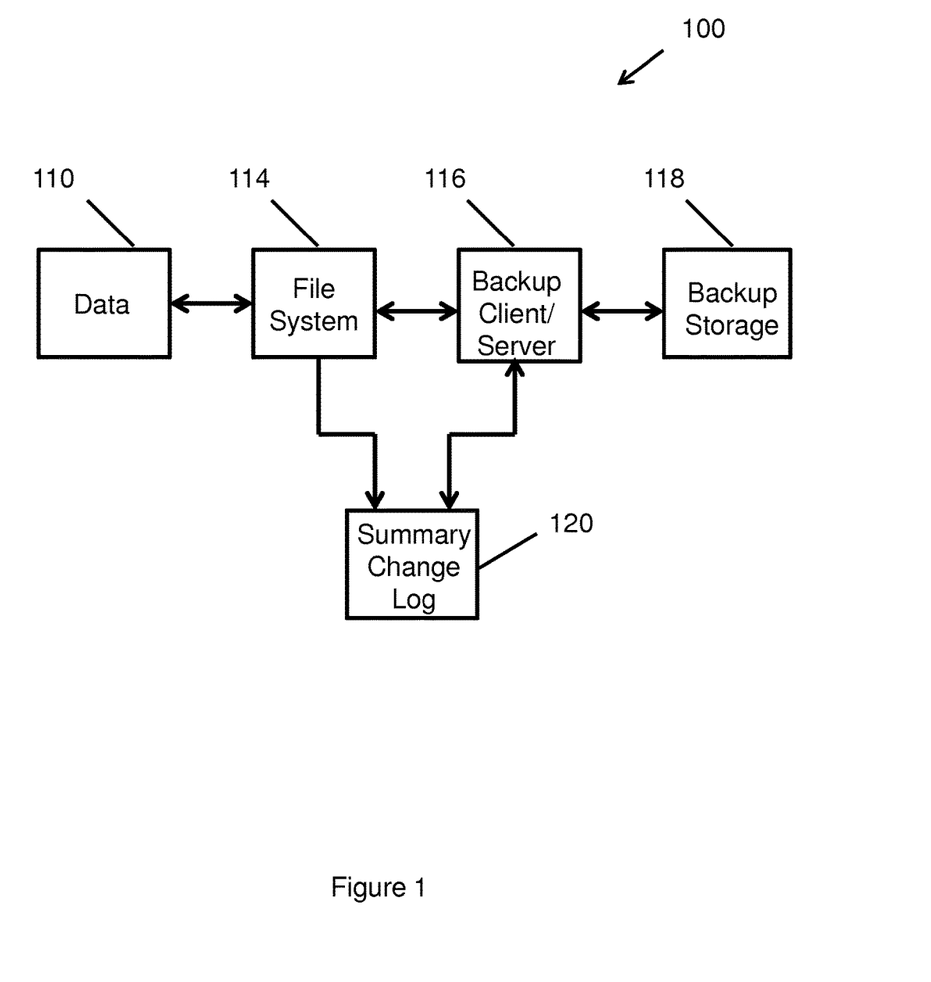
FIG. 1 is a diagrammatic view of a networked data system with backup of the type with which the invention may be employed.

FIG. 1 illustrates a networked data system 100 of the type with which the invention may be employed in which data is backed up. The data system may be part of a local area network, a wide area network or even a stand-alone system. Primary data such as file system objects, e.g., files or directories, for instance, may be stored on one or more storage devices in a data store 110, and the files may be associated with a file system 114 of the server, a database or the like. The system may include one or more backup clients and/or servers 116 for backing up the data files and other file system objects to backup storage 118. The backup client/servers 116 may comprise backup agents which manage the copying and storage of data files from storage 110 to backup storage 118. The backups in backup storage 118 may comprise an initial full backup of the file system objects in data storage 110. The full backup may then be updated periodically with incremental backups of the changes to the file system objects which have occurred since the last backup. By recording only the incremental changes in data, the amount of storage required for backup storage can be substantially reduced from that required for a full backup, and the backup process can be performed more quickly than performing a full backup.

Data system 100 may be a transactional data processing system, and the data in the storage 110 may comprise transactional data which is subject to frequent change. Data may be frequently created, modified or deleted as a result of data processing operations. In order to maintain records of changes to the data, data processing systems typically record metadata (information) describing all changes to file system objects in a summary change log 120. As shown in FIG. 1, the summary change log may communicate with the file system 114 which records information about all changes to data in the change log, and may communicate with backup client/servers 116 which use the change information to facilitate backup. As will be described in more detail below, the summary change log 120 comprises a file or data structure comprising a series of sequential index entries or records of all changes made to a file system object. The records, which comprise metadata information about the changes to data, are written to the change log at the times the changes are made (committed). Accordingly, the records are written to the change log in temporal and transactional order corresponding to the times and the order in which changes to data are made.

Figure 2:
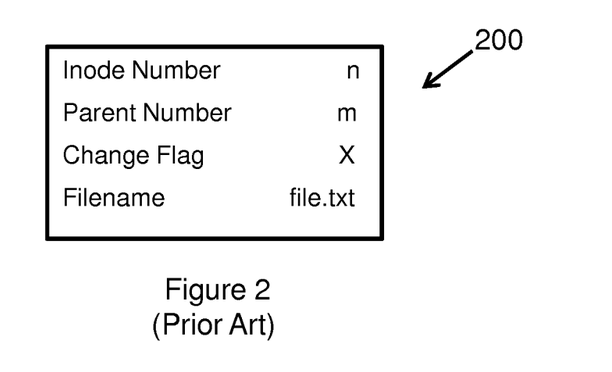
FIG. 2 illustrates the format of a typical inode entry record of a known conventional summary change log of a file system.

FIG. 2 illustrates a typical structure of an index entry record, referred to as an inode, in a conventional summary change log of a data storage system. The inode comprises a data structure which is used to represent a file system object, such as a file or a directory. As shown, the inode record may contain the inode number (n) of the file it represents, followed by the inode number (m) of the parent node of the file system object of the file. The inode additionally contains a change flag (X) that indicates how the associated file system object of the inode index record was changed. A change flag of "C" indicates that the inode file system object was created; a flag of "D" indicates that the file system object was deleted; and a flag of "M" indicates that the file system object was modified. The inode entry record also indicates the file name of the file system object, e.g., "file.txt". As will be described, inode records are entered into the summary change log file for all changes made to file system objects, and the summary change log file is indexed by inode number.

Figure 3:
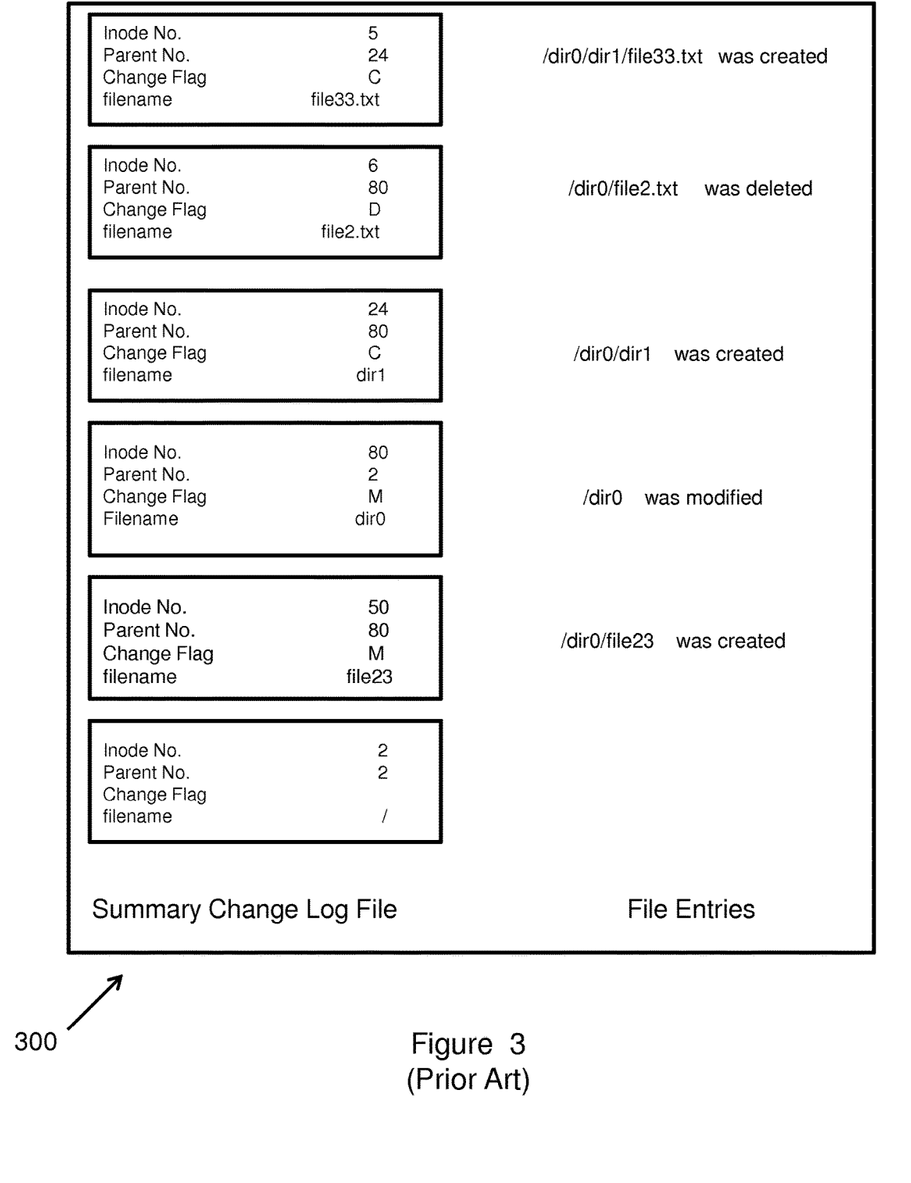
FIG. 3 is an example of a known conventional summary change log file with file system entries that employs inode entry records of the type shown in FIG. 2.

FIG. 3 is an example of a conventional summary change log file 300 of a data processing and storage system having the known form of inode entry records as shown in FIG. 2 and a corresponding descriptive listing of file entries. The conventional summary change log file shown in FIG. 3 comprises six inode records, which are indexed by their inode number. The top inode entry record in the summary change log (the most recent entry) is for inode no. 5 corresponding to a file having a file name "file 33.txt". The change flag "C" indicates that the inode and file were newly created. Since this is the first record in the summary change log, it is read first when a backup client reads the summary change log to perform an incremental backup. As shown in FIG. 3, the file "file 33.txt" was created in a directory "dir1" whose parent inode number is 24. Furthermore, as shown for inode number 24, this directory "dir1" is also a newly created directory, even though it is listed in the summary change log after its child entry (inode 5) has been reported.

Reporting of file entries in such random and transactional order in the conventional summary change log creates significant processing problems for the backup client since the log records events in non-causal order, i.e., a file is reported as being created even before the create event of its parent directory is reported. Therefore, for a backup client to use the conventional summary change log file to determine what changes have been made to file system objects and what objects need to be included in an incremental backup, the backup client must perform significant processing. It must read each and every entry from the summary change log file, and then sort the entries based on their hierarchy in order to determine which files must be included in the backup. This can require significant time and processing resources. If the summary change log file has n=1 million entries, for instance, sorting the entries after reading them from the log file may require a time period of the order of several minutes, since sorting has a processing complexity of n log (n). Most data processing systems, particularly transactional processing systems, cannot tolerate such time delays and performance impacts.

The invention avoids these problems by providing a backup system and method that is a significant improvement over the conventional entire file system traversal approach that may take several hours to complete with a new direct search and queuing approach that can be completed in seconds. The invention obviates the conventional approach of reading and sorting all change log inode entries to identify file system objects for backup. As will be described, the invention provides a new enhanced summary change log file (data structure) that comprises a new enhanced inode record entry representing a changed file system object, where the new enhanced inode record has been augmented with pointers to other inodes in the summary change log that represent related file system object in the family hierarchy of the changed file system object, so that the history of an entire family tree can be directly followed to identify file system objects that need to be backed up.

Figure 4:
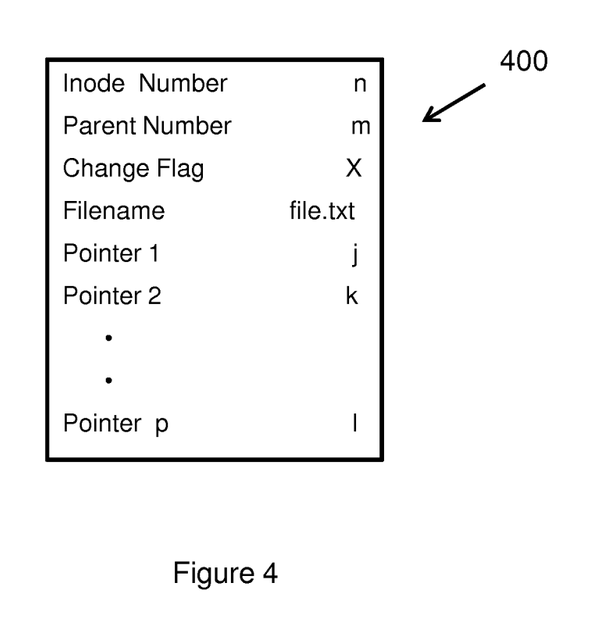
FIG. 4 illustrates an embodiment of a new structure of an inode entry record for a summary change log file in accordance with the invention.

FIG. 4 is a diagrammatic view illustrating a new enhanced and augmented inode record 400 in accordance with the invention. As shown, inode record 400 has fields for the inode record number, parent inode number, change flag, and file name, as does the conventional inode record 200 of FIG. 2. In addition, in accordance with the invention, and as shown in the figure, enhanced inode record 400 has been augmented with a plurality of additional fields for pointers, e.g., Pointer 1, Pointer 2 . . . Pointer p, that point to inode records of other related file system objects. In addition to the inode number of the parent inode which is already listed in the inode, the added pointers may point to the numbers of inodes representing events on file system objects of preceding and succeeding members of the family hierarchy, such as children and other intermediate family members. In a preferred embodiment, the pointers may comprise created_child and deleted_child pointers to inodes representing create and delete actions, respectively, on immediate children of the parent file system object. The pointers may also comprise created_next and deleted_next pointers to inodes representing actions on other intermediate children in the family hierarchy. The manner in which the enhanced and augmented inode 400 of the invention is created and used will be described in connection with FIG. 5.

Figure 5:
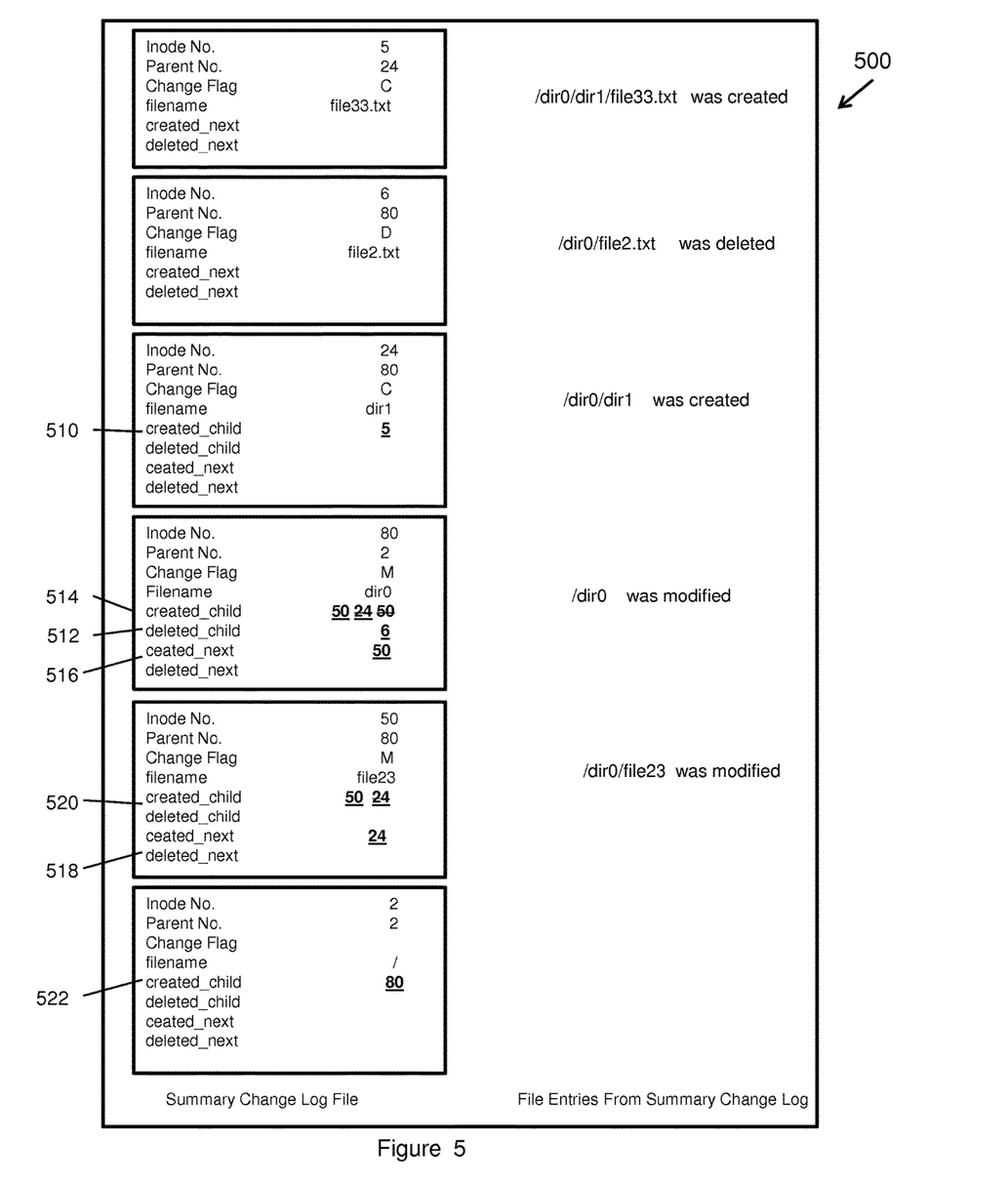
FIG. 5 illustrates an embodiment of a new and improved summary change log file in accordance with the invention employing the new inode entry record structure as shown in FIG. 4.

FIG. 5 illustrates a new and improved summary change log file 500 in accordance with the invention embodies the enhanced and augmented inode records shown in FIG. 4 and described above. As shown, the summary change log file 500 comprises a data structure comprising a plurality of the enhanced and augmented inode entry records of the invention and associated file entry records from the summary change log. Each inode record represents an event such as a creation, a change or a deletion of an associated file system object. The entries in the summary change log file are created and listed in temporal (chronological) order according to the times at which the change events to the various file system objects occurred, with the topmost entry in the log file being the most recent. Thus, as with the conventional summary log file of FIG. 3, the change events to file system objects occur at random times, and the corresponding entry records in the summary change log file of FIG. 5 are, accordingly, in random and temporal order.

As will be described, the invention affords a method of preprocessing the summary change log in a single pass to augment the pointers of the inode entry records with the inode numbers of the records corresponding to their related descendents to link the records together. This enables sorting and reporting inode records of related file system object change events in a family hierarchy in chronological order of occurrence using the augmented summary change log file 500 to identify file system objects which have changed since last backup and need to be included in the next backup. In a preferred embodiment, the invention does this by traversing the inode records of the augmented summary change log file in depth first search (DFS) order according to their times of occurrence events to identify the changed file system objects that must be backed up.

Figure 6:
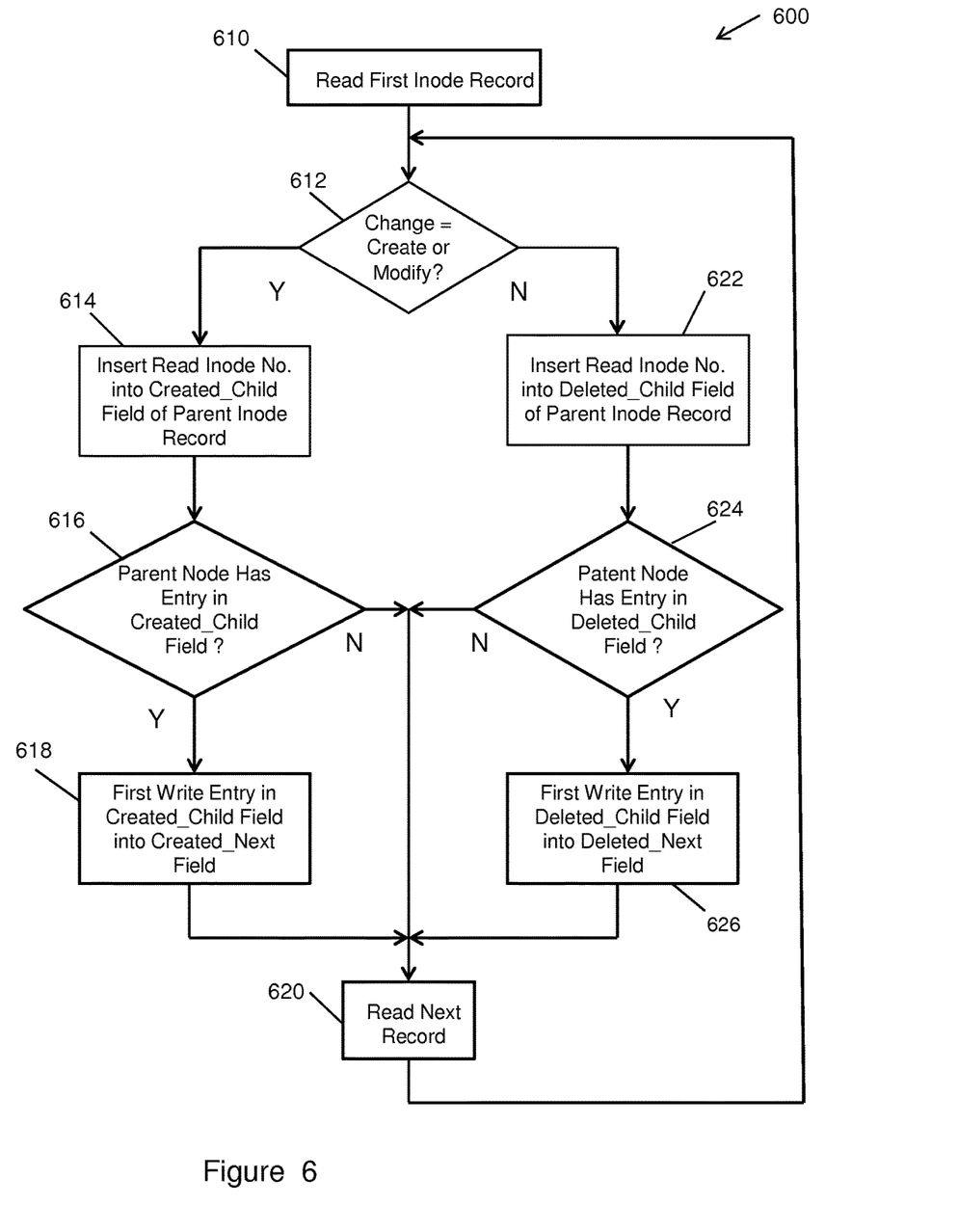
FIG. 6 illustrates a single pass algorithm (process) in accordance with the invention for preprocessing and updating the entry records in the embodiment of the summary change log file of FIG. 5 to enable the records to be processed and reported in depth first search (DFS) order.

As shown in FIG. 5, the example shown of a summary change log file 500 in accordance with the invention comprises six inode entry records corresponding change events on file system objects. The topmost inode entry record, inode no. 5, corresponds to the last, most recent entry, in the summary change log file. This most recent entry is preceded, in time order, by inode entry record nos. 6, 24, 80, 50 and 2, respectively, reading down the inode entry records in the change log, with inode no. 2 being the oldest. Each of the inode entry records is the inode record that is enhanced and augmented with pointers to related entries (file system objects), as illustrated and described in connection with FIG. 4. FIG. 6 is a flowchart of a single pass algorithm (process) 600 in accordance with the invention for preprocessing and updating the inode records in the embodiment of the summary change log file 500 of FIG. 5 by adding relevant inode numbers to the appropriate pointer fields to link related records together and enable the records to be processed and reported in depth first search (DFS) order. FIG. 5 will be described in the course of describing FIG. 6 as this will facilitate a better understanding of the invention.

Referring to FIG. 6, which as indicated above is a single pass algorithm for preprocessing the inode entry records of the summary change log file of FIG. 5 to supplement and augment the inode entry records with pointers to inode records for related file system objects, at 610 the first inode entry record (the most recent record) is read. This inode record entry is inode no. 5, which is a child entry since the inode record indicates that inode no. 24 is the parent record. At 612, process 600 reads the change flag of inode record 5 to determine whether the change event is a create, a modify or a delete event. If the event is a create or modify event, the process 600 follows the left-hand leg of the process. If the event is neither a create nor a modify event, it is a delete event, and the process follows the right-hand leg of the flowchart. Since the change flag of inode no. 5 is a "C", the inode represents create event for filename file33.txt. Accordingly, process 600 proceeds to step 614, at which the process accesses the inode record for parent inode 24, the number of which is indicated in the "parent no." field, and inserts the number for inode no. 5 into the created_child field of parent inode record 24, as indicated by the underlined "5" at 510 in FIG. 5. This ties the parent inode 24 to inode 5, and indicates that inode 5 is a child inode of the parent inode. This relates file system object 33.txt as being the direct child descendent of the file system object represented by parent inode 24. If the process 600 determines at 616 that the parent inode 24 already has a non-zero entry in the created_child field (which in this example it does not), the process would then continues to step 618 where the entry that was already in the created_child field the parent inode would have been copied into the created_next field of the parent inode before inserting the inode no. 5 into this field. (This will be illustrated below in connection with inode 80.) Since parent inode no. 24 does not already have an entry in the created_child field, the number "5" is inserted into this field, as shown, and the process 600 moves to step 620 where the next entry record for inode no. 6 of the summary change log file is read and the process 600 repeats.

As shown in FIG. 5, the next inode no. 6 has a parent inode no. 80, and the change flag for inode no. 6 is a "D", indicating that file file2.txt which the inode represents was deleted. Since the file file2.txt was deleted, it is unnecessary to back up that file. However, its parent and/or siblings may have changed and should be backed up so it is necessary to consider the hierarchy. Thus, at 612, process 600 branches to step 622 where the process inserts the read inode number "6" for inode no. 6 into the deleted_child field of parent inode number 80. This is indicated in FIG. 5 at 512 which shows "6" inserted into the deleted_child field of inode 80. If at step 624 parent node 80 already had a non-zero entry in the deleted_child field (which it did not), that entry would have been copied into the deleted_next field of the parent inode 80 before inserting the red inode no. 6 into the deleted child field. The process then moves to step 620 where the next entry is read, and the process 600 is repeated for the next inode in the summary change log.

The third inode entry in the summary change log file 500 is inode no. 24, which has a parent inode no. 80, and a change flag of "C" indicating that file system object dir1 represented by inode no. 24 was created. According to step 614 of process 600, the number "24" of inode 24 is to be inserted into the created_child field of parent inode no. 80. However, as shown at 514 in FIG. 5, this field already contains the number "50" for inode no. 50. Accordingly, the process moves to step 618 where the number "50" is written into the created_next field of inode 80, as shown at 516. The original number 50 is deleted from the created_child field 514 as indicated in the figure by the strikethrough "50", and replaced by the number "24".

The next entry in the summary change log file is inode number 80, which has a parent inode no. 2 and a change flag of "M" indicating that file system object dir0 represented by that inode was modified. Since inode number 80 indicates it has a parent inode 2, it is a child inode. Thus to process this inode entry, the created_child field of parent inode no. 2 is updated with "80", as indicated at 522.

The next entry in the summary change log file is for inode no. 50, which has as a parent inode no. 80 and a change flag of "M" indicates that file system object file23 was modified. Since inode no. 80 is the parent of inode no. 50, the created_child field of inode no. 80 is due to be updated with the inode no. 50. However, since the created_child entry of inode no. 80 already contains the inode no. 24, the number "24" is copied to the created_next entry of inode no. 50, as indicated at 518.

Figure 7:
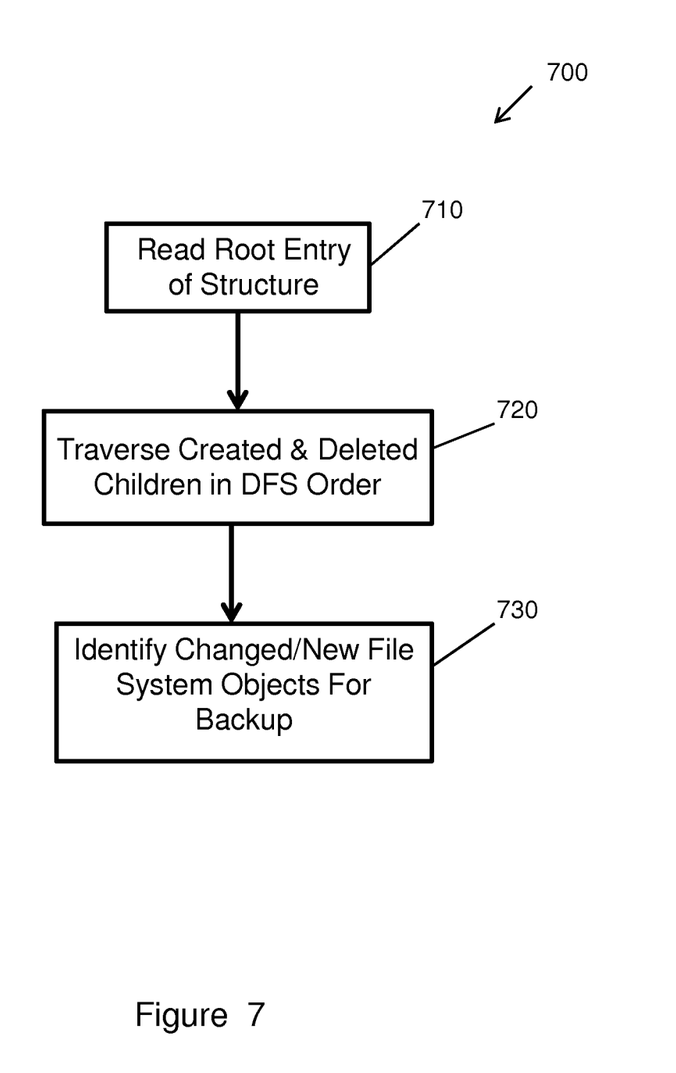
FIG. 7 illustrates an embodiment of an algorithm in accordance with the invention for DFS searching and processing of the records of the summary change log file to identify files for backup.

Thus, as can be observed from FIG. 5, all of the inode entries of the file system are connected to their parents in hierarchical order forming a graph or tree structure such that the inode entries can be traversed in order. This may be accomplished, as illustrated by a process 700 shown in FIG. 7, by first reading a root entry parent inode (inode no. 2) of the summary change log file data structure, as indicated at 710, and traversing its lists of created and deleted children in DFS order, as indicated at 720. Each of the created and deleted children may have their own lists of created and deleted children, and each branch of the tree is recursively followed to its end. Then the process moves back up the hierarchy to the next branch of the tree and follows that branch to its end, and repeats the process for all branches of the root node. As the process traverses the inodes, it can identify those inodes which have been created or modified and queue them for backup of their corresponding file system objects, as indicated at 730. It is unnecessary, of course, to back up any file system object that was deleted. This traversal of the summary change log file to identify and queue inode entries as described may take at most a few second, which is a significant improvement over the conventional approach that, depending on the size of the data store, may take hours. Following each incremental backup, the summary change log may be flushed to storage and a new summary change log started for the next backup.

While the foregoing has been with reference to particular embodiments of the invention, it will be appreciated by those skilled in the art the changes to these embodiments may be made without departing from the principles and the spirit of the invention, the scope of which is defined by the appended claims.

The invention claimed is:

1. A method of backup of data in a processing system that records information about changed file system objects in a summary change log that includes a listing of inode records representing corresponding file system objects that were changed since a previous backup, each inode record having metadata that indicates the type of change and a parent inode record of a corresponding parent file system object, comprising:

augmenting each inode record corresponding to one file system object with a plurality of fields for pointers to other inode records representing descendent file system objects that were created or deleted by said one file system object, there being separate pointers to inode records corresponding to file system objects that were created or deleted by said one file system object;

reading a first inode record listed in said summary change log to determine the type of change to a corresponding first file system object of said first inode record made by a parent file system object of said first file system object, and adding an identifying number of the first inode record to an appropriate pointer field of an inode record of said parent file system object;

repeating said reading and adding for a next and other unread inode records of said summary change log to link together inode records of families of related file system objects in corresponding tree structures; and executing a depth first search of a tree structure starting with a root inode of the tree structure to identify changed file system objects for inclusion in a next backup.

2. The method of claim 1, wherein said pointers to other inode records representing descendent file system objects, and said augmenting comprises adding to pointers numbers of inode records of children of said parent file system object.

3. The method of claim 2, wherein said pointers to said inode records of children comprise pointers to inode records of immediate and intermediate descendents of said parent file system object.

4. The method of claim 1, wherein said pointers of said parent inode record comprise pointers to a created child inode record and to a deleted child inode record, and said adding comprises adding the number of said first inode record to the field of either the created child pointer or the deleted child pointer of the parent inode record depending upon said type of change indicated in the first inode record.

5. The method of claim 4, wherein said pointers further comprise a created next pointer and a deleted next pointer, and wherein said method further comprises, prior to said adding said number to the field of either the created child or to the deleted child pointer of the parent inode record, moving any inode number already present in such field to a corresponding field of the created next or the deleted next pointer of the parent inode record.

6. The method of claim 1, wherein said first inode record is a most recent inode record listed in said summary change log, and wherein said reading and said repeating steps are executed in a single pass through successive inode records of said summary change log in reverse chronological order and an updating of the pointers of the parent inode record of each said successive inode record.

7. The method of claim 1, wherein said executing said depth first search comprises traversing in DFS order the created and the deleted children inode records indicated by pointers in the root inode, and said identifying comprises queuing file system objects of said summary change log that were created or modified for backup in said next backup.

8. The method of claim 1 further comprising flushing said summary change log file following said next backup, and creating a new summary log change file for recording new changes to file system objects.

9. Non-transitory computer readable media for storing executable instructions for controlling the operation of a computer to perform a method of backup of data in a processing system that records information about changed file system objects in a summary change log that includes a listing of inode records representing corresponding file system objects that were changed since a previous backup, each inode record having metadata that indicates the type of change and a parent inode record of a corresponding parent file system object, the method comprising:

augmenting each inode record corresponding to one file system object with a plurality of fields for pointers to other inode records representing descendent file system objects that were created or deleted by said one file system object, there being separate pointers to inode records corresponding to file system objects that were created or deleted by said one file system object;

reading a first inode record listed in said summary change log to determine the type of change to a corresponding first file system object of said first inode record made by a parent file system object of said first file system object, and adding an identifying number of the first inode record to an appropriate pointer field of an inode record of said parent file system object;

repeating said reading and adding for a next and other unread inode records of said summary change log to link together inode records of families of related file system objects in corresponding tree structures; and executing a depth first search of a tree structure starting with a root inode of the tree structure to identify changed file system objects for inclusion in a next backup.

10. The non-transitory computer readable media of claim 9, wherein said pointers to said other inode records comprise pointers to inode records of immediate and intermediate descendents of said parent file system object, the pointers comprising pointers to a created child inode record and to a deleted child inode record, and wherein said adding comprises adding the number of said first inode record to the field of either a created child pointer or a deleted child pointer of the parent inode record depending upon said type of change indicated in the first inode record.

11. The non-transitory computer readable media of claim 9, wherein said pointers further comprise a created next pointer and a deleted next pointer, and wherein said method further comprises, prior to said adding said number to the field of either the created child or to the deleted child pointer of the parent inode record, moving any inode number already present in such field to a corresponding field of the created next or the deleted next pointer of the parent inode record.

12. The non-transitory computer readable media of claim 9, wherein said first inode record is a most recent inode record listed in said summary change log, and wherein said reading and said repeating steps are executed in a single pass through successive inode records of said summary change log in reverse chronological order of changes and an updating of the pointers of the parent inode record of each said successive inode record.

13. The non-transitory computer readable media of claim 9, wherein said executing said depth first search comprises traversing in DFS order the created and the deleted children inode records indicated by pointers in the root inode, and queuing file system objects of said summary change log that were created or modified for backup in said next backup.

14. The non-transitory computer readable media of claim 9, wherein the method further comprising flushing said summary change log file following said next backup, and creating a new summary log change file for recording new changes to file system objects.

* * * * *